May 2, 1950 W. B. HAYS 2,506,215
PLANETARY ROTARY CUTTING MECHANISM
Filed Nov. 20, 1945 2 Sheets-Sheet 1

Inventor
WILLIAM B. HAYS,
Attorneys

May 2, 1950 W. B. HAYS 2,506,215
PLANETARY ROTARY CUTTING MECHANISM
Filed Nov. 20, 1945 2 Sheets-Sheet 2

WILLIAM B. HAYS, Inventor

Patented May 2, 1950

2,506,215

UNITED STATES PATENT OFFICE 2,506,215

PLANETARY ROTARY CUTTING MECHANISM

William B. Hays, Norman, Okla.

Application November 20, 1945, Serial No. 629,880

1 Claim. (Cl. 56—25.4)

This invention relates to cutting machines, and more particularly to rotary cutting machines of the type wherein the rotary cutting element moves in a planetary path with relation to the shaft of its driving element.

A main object of the invention is to provide a novel and improved cutting machine of the planetary type adapted to be employed for providing a circular cutting action to cut and remove material from large surface areas with a minimum amount of power.

A further object of the invention is to provide an improved planetary rotary cutting machine having a small rotary cutter rotating around its own axis and at the same time rotating around the larger circumference of a stationary central disc member which guides the small cutter, said machine being relatively simple in construction and requiring a minimum amount of power for operation.

Other objects and advantages of the invention will appear from the following description and claim, and from the accompanying drawings wherein:

Figure 1:
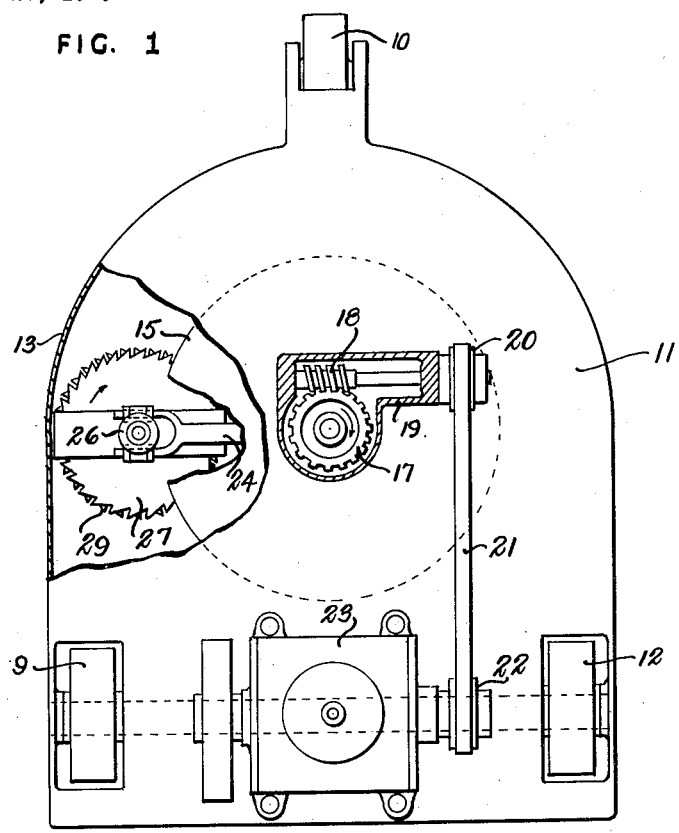
Figure 1 is a top plan view, partly broken away, of a lawn-mower employing the cutting mechanism of this invention.
Figure 2:
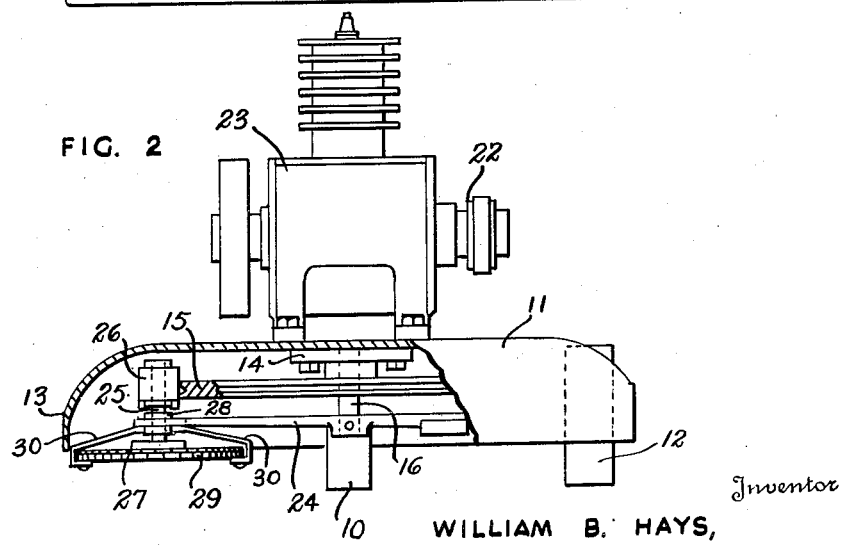
Figure 2 is an end elevational view of the lawn-mower of Figure 1, shown partly in cross-section.
Figure 3:
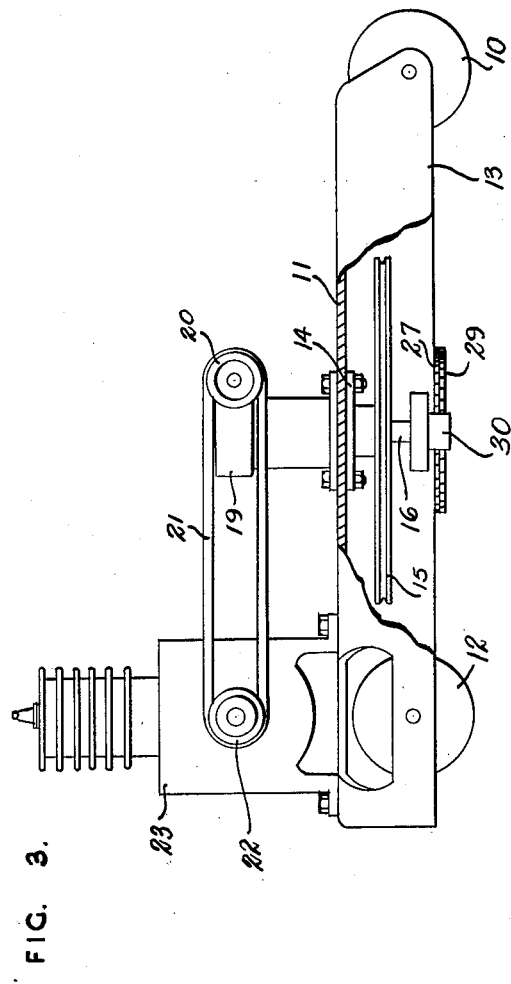
Figure 3 is a side elevational view of the lawn-mower of Figure 1, a portion thereof being broken away to show internal details of the structure.

Referring to the drawings, wherein for the purpose of illustration the cutting mechanism of this invention is shown applied to a lawn-mower, 11 designates a horizontal body member supported in spaced position above the ground for movement parallel thereto by three wheels 9, 10 and 12 appropriately journalled to said body member. Body member 11 is formed with a peripheral flange 13 extending downwardly around said body member and defining a cavity under the body member. Rigidly secured in said cavity to the under surface of the body member is a bracket member 14 which carries rigidly secured thereto a large horizontal disc member 15. Concentric with said disc member 15 a vertical bore is provided in bracket member 14 and through body member 11 in which is rotatively positioned a shaft 16, the upper end of which carries a worm gear 17 which is supported by a suitable bearing for rotation with respect to body member 11. Worm gear 17 is operatively engaged by a worm member 18 rotatively supported in horizontal position on body member 11, said worm element 18 and worm gear 17 being contained in a housing 19 through which the end of the worm shaft extends. The end of the worm shaft carries a pulley 20 which is coupled by a belt 21 to a pulley 22 carried on the shaft of a power unit 23 which may be a gasoline engine or the like.

Secured to the lower end of vertical shaft 16 is an arm 24. To the end of arm 24 is rotatively secured a vertical shaft 25 to the upper end of which is secured a friction wheel 26 which frictionally engages disc 15 at its periphery for rolling contact therewith. The lower end of shaft 25 carries a cutter wheel 27. Shaft 25 is formed with a bearing collar 28 for rotatively supporting the shaft on arm 24. Supported from arm 24 by brackets 30, 30 and rigid therewith is a shear disc 29 positioned beneath and coaxial with rotary cutter wheel 27, shear disc 29 being of the same diameter as cutter wheel 27 and having teeth disposed adjacent to the teeth of wheel 27 to provide relatively stationary shearing edges with respect to the teeth of the rotary cutter wheel.

Guard flange 13 of body member 11 terminates immediately above and adjacent to the shearing teeth of rotary cutter wheel 27 and shear disc 29 and the forward portion of body member 11 is substantially semi-circular corresponding to the arcuate path defined by the rotating outer teeth of the shear discs 27 and 29 at the forward portion of the device.

In operation, power unit 23 transmits torque to vertical shaft 16 through belt 21 and worm elements 18 and 17. Arm 24 is rotated by shaft 16, causing friction wheel 26 to roll around the periphery of stationary disc 15. This rotates shaft 25 and cutter wheel 27 and simultaneously moves the cutter wheel 27 and its adjacent shear disc 29 in a circular path around shaft 16. The relatively rotating teeth of cutter wheel 27 and shear disc 29 shear off upstanding material encountered thereby such as grass, as they move around their planetary path, and as the mechanism is moved forwardly it cuts a path equal in width to the external diameter of the orbital path of the rotating cutter discs 27 and 29.

In applications of the invention where the upstanding material to be cut is sufficiently rigid to be properly supported in the path of the rotary cutter teeth the shear disc 29 may be omitted.

In the above disclosed specific embodiment employed for grass cutting, the shear disc may be positioned above the rotary cutter disc instead of below within the contemplation of the invention.

Although specifically described herein in connection with a lawn-mower device, the mechanism is adapted for various other applications such as hedge trimmers, surface planers, floor sanders or any other application where a large surface area is to be cut or surfaced. The mechanism of this invention requires a smaller amount of power for the area cut as compared with conventional cutting mechanisms turning about a single axis. In addition, there is a substantial saving in weight as compared with solid circular discs rotating around a single axis for cutting a path of equal width. The reduction in weight reduces the amount of power required to start the cutting action and to keep the cutting elements rotating at required cutting speed. This permits the employment of a lighter and less expensive power unit and supporting framework for the machine. The reduction in weight provides increased portability and permits the machine to be more easily handled and moved about.

In view of the cutting action close to the forward periphery of the machine, a lawn mower as disclosed herein can mow closer to fences, buildings and other obstructions than conventional mowers, and can cut grass, weeds or other vegetation of any height.

Although a specific embodiment of a planetary cutting mechanism has been disclosed in the foregoing description, it will be understood that various modifications within the spirit of the invention may occur to those skilled in the art. Therefore it is intended that no limitations be placed on the invention other than as defined by the scope of the appended claim.

What is claimed is:

A lawn-mower comprising a wheeled carriage having a horizontal body portion, a disc member rigidly secured to the under surface of said body portion, a first vertical shaft rotatively supported with respect to said body portion and extending axially of said disc member, an arm carried by said first shaft extending adjacent the periphery of said disc member, a second vertical shaft rotatively carried by said arm, said second shaft having a friction wheel engaging said periphery in rolling contact therewith, a first horizontal toothed cutter wheel carried by said second shaft, a second horizontal toothed wheel of substantially the same diameter as said first cutter wheel rigidly secured to said arm and positioned coaxially with and adjacent to said first cutter wheel, and power means for rotating said first vertical shaft, said power means being mounted on said horizontal body portion.

WILLIAM B. HAYS.

REFERENCES CITED

The following references are of record in the file of this patent:

UNITED STATES PATENTS

| Number | Name | Date |
| --- | --- | --- |
| 112,338 | Harnish et al. | Mar. 7, 1871 |
| 795,082 | Warner | July 18, 1905 |
| 1,701,723 | Lyons | Feb. 12, 1929 |
| 1,817,314 | Hohn | Aug. 4, 1931 |
| 2,194,617 | Scott | Mar. 26, 1940 |